June 15, 1937.   R. G. AURIEN   2,083,541
BRAKE
Filed Sept. 11, 1936   4 Sheets-Sheet 1
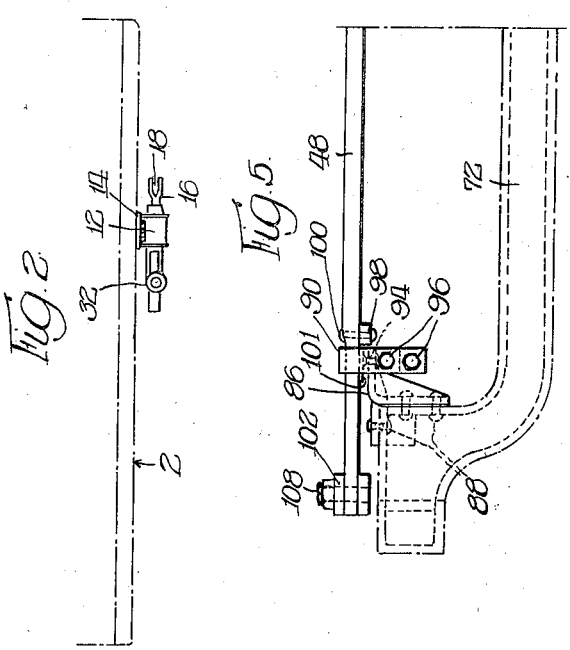
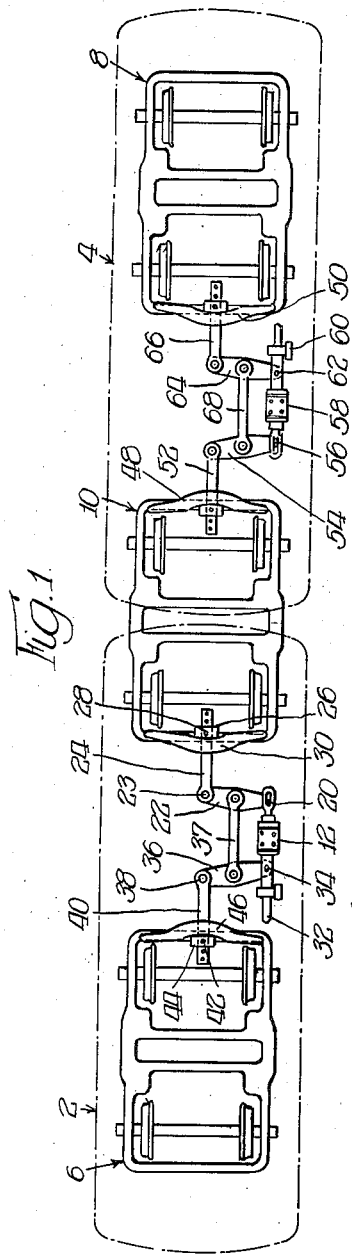
Inventor:
Ray G. Aurien,
By ...... atty Inventor:
Ray G. Aurien,

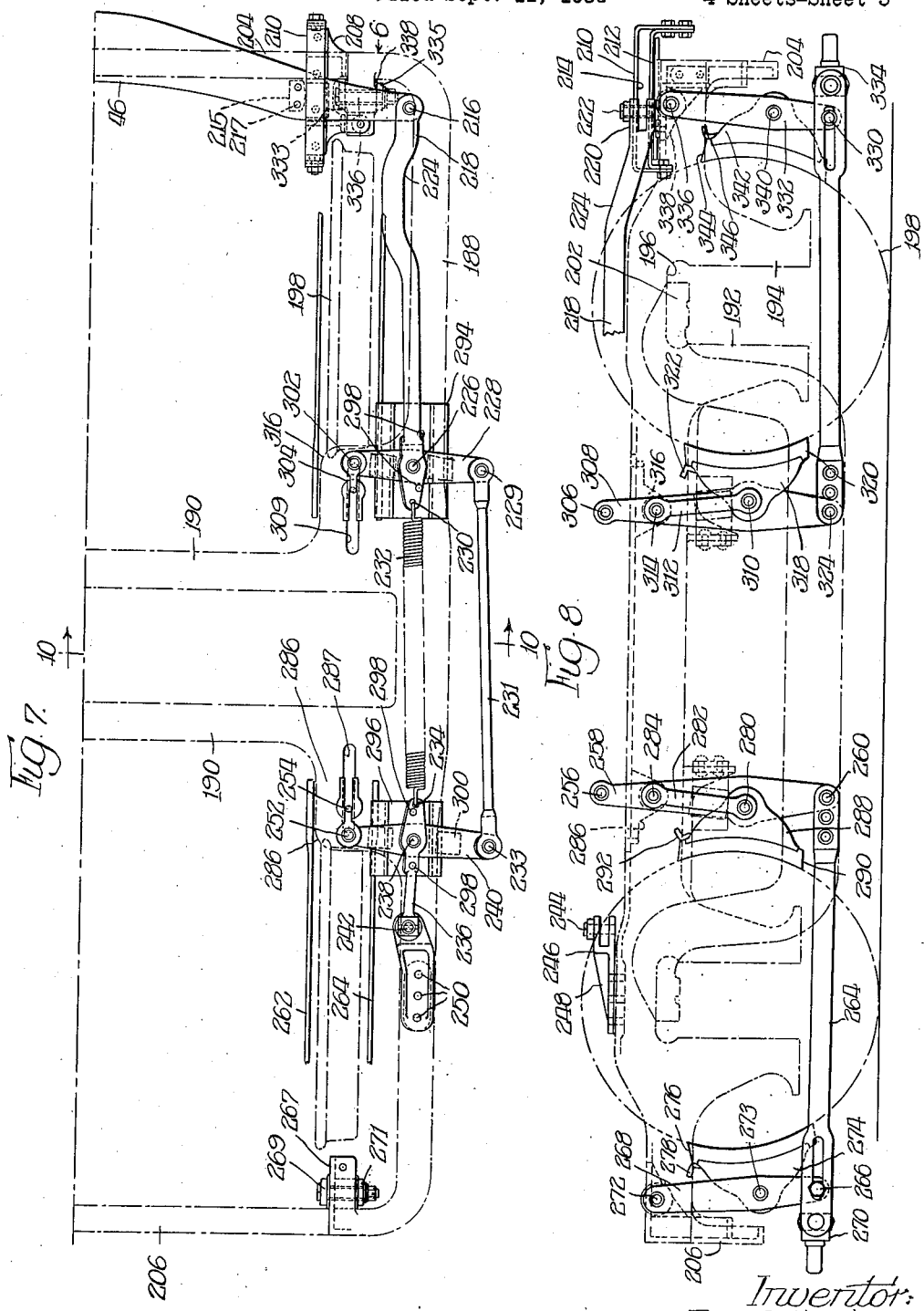

June 15, 1937.  R. G. AURIEN  2,083,541
BRAKE
Filed Sept. 11, 1936  4 Sheets-Sheet 4
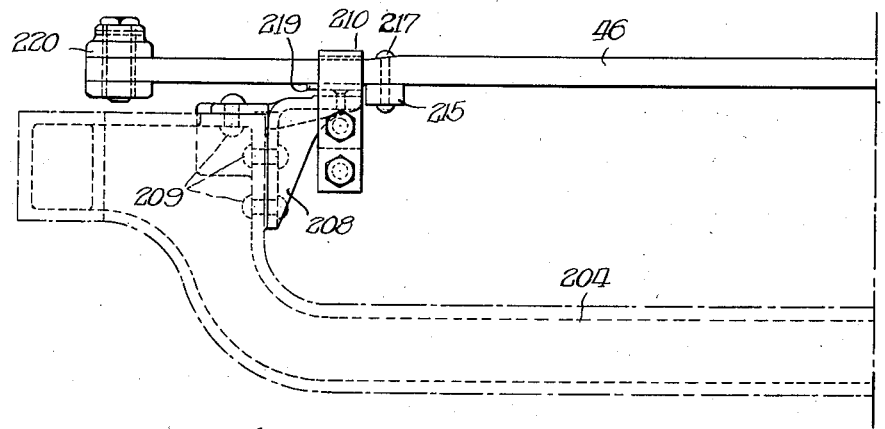
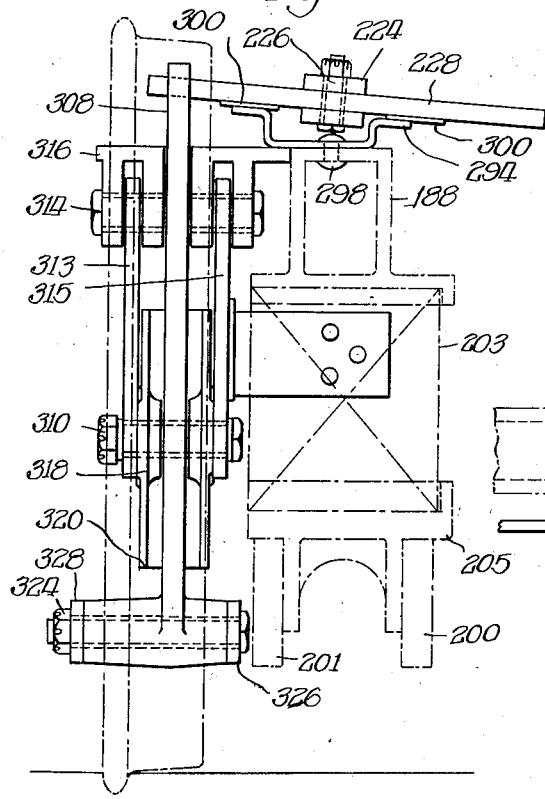 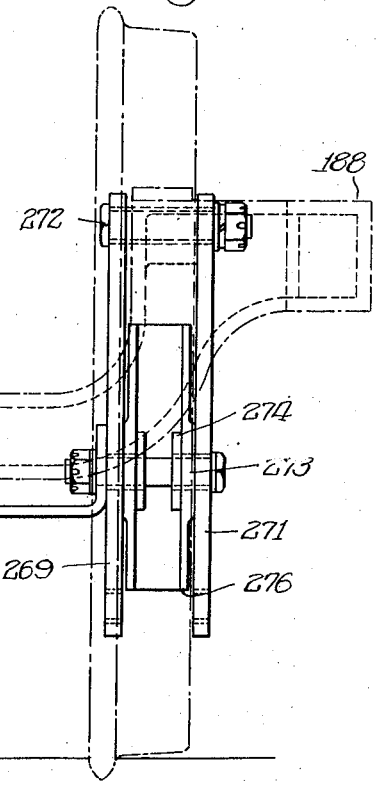
Inventor
Ray G. Aurien,
By Orrin O. B. Garner atty Patented June 15, 1937

2,083,541

UNITED STATES PATENT OFFICE 2,083,541

BRAKE

Ray G. Aurien, Chicago, Ill., assignor to American Steel Foundries, Chicago, Ill., a corporation of New Jersey Application September 11, 1936, Serial No. 100,238

22 Claims. (Cl. 188—47)

This invention pertains to clasp brakes and more particularly a design of clasp brakes which is suitable for articulated two-car trains.

An object of my invention is to provide a novel arrangement in such a clasp brake structure which will facilitate the application of clasp brakes to articulated cars and more particularly an arrangement which will be suitable for such cars when a single truck is used to support adjacent ends of two cars.

Yet another object of my invention is to provide a clasp brake arrangement for articulated cars and particularly suitable for motor trucks in that it is very conservative of space.

A still further object of my invention is to provide a novel form of clasp brake structure wherein a portion of the brake equipment associated with the truck upon which the cars are articulated and the entire brake equipment associated with one end truck may be operated by a single power means.

With these and various other objects in view, my invention may consist of certain novel features of construction and operation as will be more fully described and particularly pointed out in the specification, drawings and claims appended hereto.

In the drawings which illustrate embodiments of my invention and wherein like reference characters are used to designate like parts—

Figure 1 of the drawings is a top plan view of a two-car articulated railway vehicle embodying my invention;

Figure 2 is a fragmentary side elevation of the vehicle structure shown in Figure 1 and illustrating the attachment of the power means to the car body;

Figure 5 is an end elevation of the truck construction shown in Figures 3 and 4;

Figure 6 is a sectional view through the truck frame adjacent the transverse center line thereof, the section being taken substantially in the vertical plane indicated by the line 6—6 of Figure 3;

Figure 7 is a top plan view of one of the end trucks embodying my invention, only one half of the truck being shown inasmuch as the construction is the same on both sides thereof;

Figure 8 is a side elevation of the truck construction shown in Figure 7;

Figure 9 is an end elevation of the truck construction shown in Figures 7 and 8, the view being taken at the right end;

Figure 3:
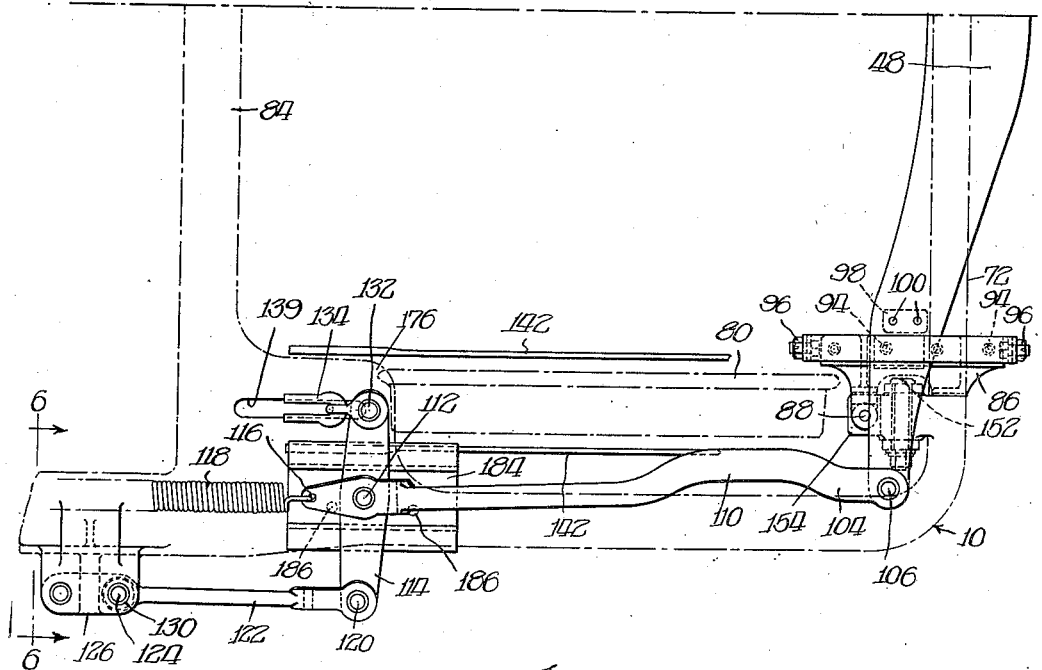
Figure 3 is a top plan view of the brake arrangement associated with the intermediate truck, only one quarter of the truck being shown for the sake of simplicity inasmuch as the brake arrangement is the same on opposite sides and on opposite ends.

Figure 10 is a transverse sectional view taken substantially in the transverse vertical center plane of the truck construction shown in Figures 7 and 8, the section being taken substantially in the plane indicated by the line 10—10 of Figure 7; and Figure 11 is an end elevation of the truck construction shown in Figures 7 and 8, the view being taken at the left end.

Describing my invention in more detail, the car bodies 2 and 4 have their remote ends supported respectively on identical car trucks 6 and 8 respectively and their adjacent or articulated ends supported upon the truck 10. The power means or brake cylinder 12 is supported beneath the car body 2 in the usual manner from the bracket 14 which is secured to the frame of the car body as by any convenient means. The cylinder piston 16 has the jaw-like portion 18 which is pivotally and adjustably connected as at 20 to the horizontal body lever 22, the opposite end of the body lever 22 having a pivotal connection as at 23 to the pull rod 24. The opposite end of the pull rod 24 is pivotally and adjustably connected as at 26 to the clamp and roller assembly 28 by means of which, in the well-known manner commonly used, it is movably associated with the radius bar 30 which is mounted upon the truck 10 in the manner hereafter to be more fully described. Upon the end of the cylinder opposite the piston is mounted the slack adjuster 32 and to the slack adjuster as at 34 is pivotally and adjustably connected the body lever 36, the opposite end of the body lever having a pivotal connection as at 38 to the pull rod 40, said pull rod 40 having its opposite end pivotally and adjustably connected as at 42 to the clamp and roller assembly 44 which likewise has a movable connection with the radius rod 46, said radius rod being mounted upon the truck 6 in the manner hereafter to be more fully described. The body levers are joined by the pull rod 37 having pivotal connections at its ends with the said body levers at points intermediate their ends.

The radius rods 48 and 50 are mounted upon the trucks 10 and 8 respectively at the opposite end of the vehicle similarly to those already mentioned. The radius rods 48 and 50 are joined by a series of pull rods and operating levers identical to that just described at the opposite end of the vehicle and consisting of the pull rod 52 connecting the radius rod 48 to the body lever 54, said body lever having its opposite end connected as at 56 to the piston of the cylinder 58, the opposite end of the cylinder having the slack adjuster 60 to which is connected as at 62 the body lever 64, said body lever being connected to the radius rod 50 by the pull rod 66. The body levers 54 and 64 are joined intermediate their ends by the pull rod 68.

In operation, actuation of the power means or cylinder 12 will cause a movement to the right, as viewed in Figure 1, of the cylinder piston 16, thus acting to spread the pivot points 20 and 34 at which the body levers 22 and 36 are respectively secured to the cylinder, and, since the body levers 22 and 36 are secured intermediate their ends by the pull rod 37, their opposite ends will be drawn toward each other, thus moving the pull rod 40 to the right and the pull rod 24 to the left and thus, through the medium of the radius bars 46 and 30 respectively, actuating the brakes associated therewith in a manner to be hereinafter more fully described. The brake cylinder 58 and its associated levers and pull rods operate in a similar manner to actuate, through the pull rods 52 and 66 and their respectively associated radius bars 48 and 50, the brake mechanism associated with the opposite end of the vehicle.

Describing in more detail the truck 10 and the form of brake rigging associated therewith (Figures 3, 4, 5 and 6), the said truck may consist generally of a frame work comprising the side frames 70 and the end rails 72, said side frames being provided adjacent their ends with the column guides 74 and 76 forming the jaw or opening 78 for the reception of journal boxes (not shown) of the wheel and axle assemblies 80. Mounted upon the said journal portion of the wheel and axle assemblies in the usual manner are the equalizers 82 upon which the truck frame may be supported by the usual spring groupings (not shown). The side frames 70 are integrally joined by spaced transoms 84 providing the usual support means for the bolster (not shown) upon which the car body is carried. The radius bar 48 is supported on the end of the truck frame approximately over the end rail 72 through the medium of brackets 86 secured adjacent the corner of the frame inwardly of the junction of the end rail with the side frame by means of rivets 88, said bracket being elongated longitudinally of the truck, as shown most clearly in the top and side views (Figures 3 and 4), in order to provide support for the radius bar 48 in its various positions as the brake parts are moved during actuation and release of the brakes and also to provide for the usual slack adjustment. Upon the bracket 86 may be secured the lower and upper U-shaped straps 88 and 90, respectively, providing therebetween the elongated slot 92 within which may be confined the end of the radius rod 48. The lower strap 88 may be secured to the bracket 86 as by means of the rivets 94—94, and the upper strap 90 may be secured to the lower strap 88 as by means of bolt and nut assemblies 96—96 adjacent each end thereof. Adjacent the bracket 86 and inwardly thereof the stop means 98 (Figure 5) may be secured to the underside of the radius bar 48 as by means of the rivets 100, thus confining the radius bar 48 against too great lateral movement, and the wear plate 101 may be secured to the underside of the radius bar 48 for engagement with the strap 88. The end of the radius rod 48 is received within the jaw portion 102 of the pull rod 104 and is pivotally secured therein as at 106 by the pin 108. The pull rod 104 is offset inwardly and upwardly as at 110 to provide proper clearance, and adjacent its opposite end it is pivotally connected as at 112 to a point intermediate the ends of the horizontal truck lever 114 and extends therebeyond to form a connection as at 116 to the release spring 118, the opposite end of the release spring 118 being likewise secured to a similar pull rod at the opposite end of the truck. The outer end of the horizontal dead truck lever 114 is pivotally connected as at 120 to the pull rod 122 which is fulcrumed as at 124 to the double bracket 126 integrally formed with the side frame 70 and provided with the jaws 128 (Figure 6) between which may be received and secured the end of the pull rod 122, the pin 130 acting as securing means. The opposite end of the bracket 126 is likewise provided with jaws 128 for connection to a pull rod corresponding to the pull rod 122, thus providing anchor means for the brake rigging at the opposite end of the truck. The inner end of the dead truck lever 114 is pivotally connected as at 132 to the clevis means 134, the opposite end of said clevis means being pivotally connected as at 136 to the live truck lever 138 which extends through the elongated slot 139 in the bracket 176 formed at the juncture of the side frame 70 with the transom 84, the lower end of said live truck lever 138 having a pivotal and adjustable connection as at 140 to the paired straps 142—142, said straps passing on opposite sides of the wheel and below the axle and having their opposite ends pivotally connected as at 144 to the lower end of the dead truck lever 146, the connection at 144 being made adjustable as by means of the manual slack adjuster 148 associated with the straps 142 at the outer ends thereof. The upper end of the dead truck lever 146 is pivotally connected as at 150 as by means of the pin 152 to the bracket 154 integrally formed on the end rail 72 adjacent its juncture with the side frame 70. The brake head 156, and its associated brake shoe 158 secured thereto by the usual key 160, is pivotally supported at a point intermediate the ends of the dead truck lever 146 as at 162. At the opposite side of the wheel the brake head 164, and its associated brake shoe 166 secured thereto as by the usual key 168, is pivotally connected as at 170 to a point intermediate the ends of the live truck lever 138 and at the same pivotal point 170 is secured the lower ends of the paired hangers 172, the upper ends of said paired hangers being pivotally secured as at 174 to the bracket 176 integrally formed on the side frame 70. The guide strap 178 is secured to the bracket 180 integrally formed with the bracket 176 on the side frame 70 as by means of rivets 182 and serves as guide means to prevent the outward spreading of the hanger 172 and the associated rigging by having engagement with the wear plate 179 secured upon the outer half of the paired hanger 172. The guide strap 184, generally U-shaped in cross section (Figure 6), may be secured to the top of the side frame 70 as by means of rivets 186—186 and provide support for the dead truck lever 114, the jaw portion of the pull rod 104 being received within the channel portion 187 and the horizontal flanges 189—189 serving as support means for the dead truck lever 114.

Figure 4:
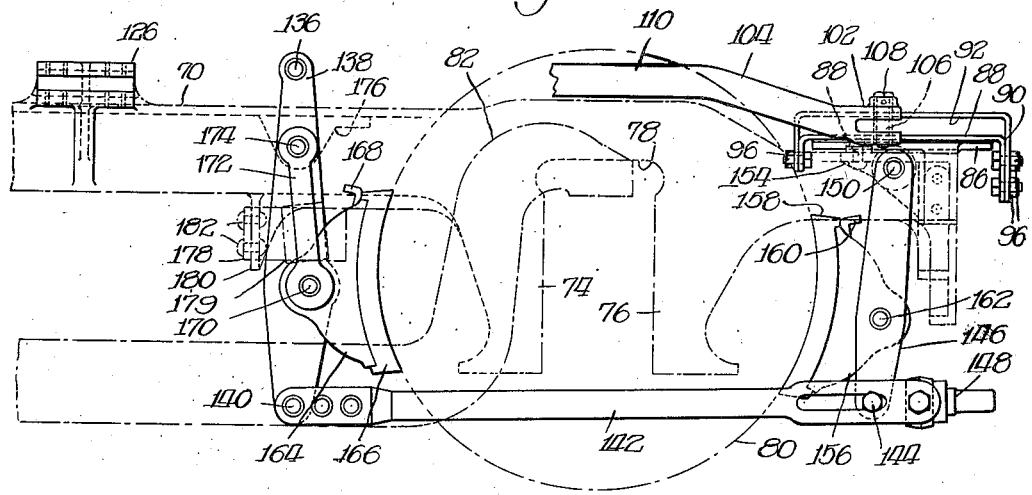
Figure 4 is a side elevation of the truck construction shown in Figure 3.

In operation, movement to the right of the radius bar 48 as viewed in Figure 3 by operation of the power means as previously described will move the pull rod 104 to the right, thus rotating the dead truck lever 114 in a clockwise direction about the pivot point 120. Such clockwise movement of the dead truck lever 114 moves the upper end of the live truck lever 138 to the right as viewed in Figure 4, thus rotating it in a clockwise direction about the pivot point 140 at its lower end and bringing the associated brake shoe 166 into engagement with the periphery of the adjacent wheel. Continued movement of the parts causes the live truck lever 138 to rotate in a clockwise direction about the pivot point 170, thus moving the paired straps 142 to the left as viewed in Figure 4 and causing clockwise rotation of the dead truck lever 146 about the pivot point 150 at its upper end, thus bringing into engagement against the opposite periphery of the said wheel the brake shoe 158 carried by the said dead truck lever 146. Upon release of the power means movement of the parts in the opposite direction is facilitated by the release spring 118 which operates through its connection at 116 with the pull rod 104, thus moving the radius bar 48 to the left (Figure 3) and bringing it to its normal position of rest.

Describing in more detail the truck and brake construction at the remote ends of my improved railway vehicle, as shown in Figures 7 to 11, the truck 6 may have the usual side member 188 joined adjacent their midpoints by the spaced transoms 190—190 between which may be received the usual bolster (not shown), said side members having adjacent their ends the integrally formed column portions 192 and 194 defining the journal opening 196 providing the usual method of connection with the associated wheel and axle assembly 198. Equalizers 200 and 201 (Figure 10), having their end portions 202 seated on said journal ends, may provide a support for the side frames through the medium of spring groupings diagrammatically shown as at 203 and seated upon the spring seat 205. Opposite ends of the side frames 188 are joined by the integrally formed end rails 204 and 206, said end rails being offset downwardly with relation to said side frame for clearance purposes as best shown in the end view (Figure 9). The radius bar 46 is supported on the end of the truck approximately over the end rail 204 as by means of the bracket 208 which is secured to the truck frame as by means of the rivets 209—209 (Figure 9), said bracket 208 being elongated as best shown in the top plan view (Figure 7) and being provided with the top and bottom straps 210 and 212 secured thereto and to each other in the manner previously described for the similar arrangement on the truck 10, thus providing the slot 214 within which may be received and guided the end of the radius bar 46. Stop means 215 may be secured on the underside of the radius bar 46 as by means of the rivets 217—217, said stop serving to limit the lateral movement of the radius bar 46. Immediately adjacent the said stop 215 and also on the underside of the radius bar 46 may be formed the wear plate 219, serving as a bearing upon which the radius bar 46 may engage the strap 212. The end of the radius bar 46 has a pivotal connection as at 216 to the pull rod 218 as by means of the jaw 220 and the pin 222. The pull rod 218 is offset inwardly and upwardly as at 224, and is pivotally connected adjacent its opposite end as at 226 to a point intermediate the ends of the horizontal live truck lever 228, extending therebeyond to form a connection as at 230 to the release spring 232, the opposite end of the release spring being connected as at 234 to the link 236, said link having a pivotal connection as at 238 to the horizontal dead truck lever 240 and being pivotally anchored at its opposite end as at 242 by means of the pin 244 to the jaw 246 integrally formed with the bracket 248, said bracket being secured to the side frame as by the rivets 250. The horizontal live truck lever 228 has its outer end pivotally connected as at 229 to the pull rod 231, the opposite end of said pull rod being pivotally connected as at 233 to the outer end of the horizontal dead truck lever 240, the inner end of said dead truck lever 240 being pivotally connected as at 252 to the clevis means 254, the opposite end of said clevis means being pivotally connected as at 256 to the upper end of the live truck lever 258, the lower end of said live truck lever 258 being pivotally and adjustably connected as at 260 to the inner and outer straps 262 and 264 respectively, the opposite ends of said straps being pivotally connected as at 266 to the paired hanger lever 268, said hanger lever 268 having inner and outer halves 269 and 271, said connection at 266 being made adjustable as by means of the manual slack adjuster 270 and said paired hanger lever 268 being pivotally supported from the bracket 267 as at 272 and pivotally supporting intermediate its ends as at 273, the brake head 274 and the associated brake shoe 276 secured thereto as by means of the usual key 278.

The live truck lever 258 with its associated rigging is pivotally supported as at 280 by means of the paired hangers 282 which are pivotally supported as at 284 from the bracket 286 integrally formed with the side frame, said live truck lever 258 extending through the elongated slot 287 formed in the bracket 286. The brake head 288 is also supported at the pivotal point 280 and carries the brake shoe 290 secured by the usual key 292. The horizontal live and dead truck levers 228 and 240, respectively, are supported in position above the side frame as by means of the channel-shaped guide plates 294 and 296, respectively, said guide plates being secured to the side frame as by means of rivets 298—298, said live and dead truck levers being supported adjacent their opposite end and through the medium of wear plates 300—300 on said brackets 294 and 296 as best shown in Figure 10. The inner end of the horizontal truck lever 228 is pivotally connected as at 302 to the clevis means 304, the opposite end of said clevis means being pivotally connected as at 306 to the upper end of the live truck lever 308 which extends through the elongated slot 309 in the bracket 316, said live truck lever with the associated rigging being pivotally supported at a point intermediate its ends at 310 by means of the paired hangers 312, having the inner and outer halves 313 and 315, respectively (Figure 10), said hangers having their upper ends pivotally supported as at 314 from the bracket 316 integrally formed on the side frame. At the pivot point 310 is also supported the brake head 318 and the associated brake shoe 320 secured to said head as by means of the key 322. The lower end of the live truck lever 308 is pivotally and adjustably connected as at 324 to the outer and inner paired straps 326 and 328 (Figure 10), the opposite ends of said straps being pivotally connected as at 330 to the lower end of the paired hanger lever 332, said paired hanger lever being formed of inner and outer halves 333 and 335, said connection at 330 being made adjustable as by means of the manual slack adjuster 334. The upper end of the paired hanger lever 332 is pivotally connected as at 336 to the bracket 338 integrally formed on the truck frame adjacent the juncture of the side frame and end rail. Pivotally supported at a point intermediate the ends of the hanger lever 332 as at 340 is the brake head 342 with its associated brake shoe 344 secured thereto by means of the key 346.

The construction and operation of the brake rigging associated with trucks 6 and 8 are identical. In operation, the rigging of truck 6 is associated with the rigging carried by the adjacent half of truck 10; and the rigging of truck 8 is likewise associated in operation with the rigging carried by the other half of truck 10 and therefore adjacent truck 8.

The rigging mounted on trucks 6 and 8 as described in Figures 7 to 11 inclusive operates as follows:

Actuation of the power means as previously described with respect to Figure 1 causes the radius bar 46 (Figure 7) to be moved to the right thus moving the pull rod 218 to the right (Figure 1) and so the horizontal live truck lever 228 is moved in a clockwise direction about the pivot point 229 thus causing the live truck lever 308 to move in a clockwise direction about the pivot point 324 until the brake shoe 328 is brought into engagement with the periphery of the adjacent wheel. Further movement causes the live truck lever 308 to move in a clockwise direction about the pivot point 310 intermediate its ends, thus moving the straps 326 to the left (Figure 8) and rotating the hanger lever 332 in a clockwise direction about its pivot point of support 336 and bringing the brake shoe 344 into engagement with the opposite periphery of said wheel. Continued application of the power causes the horizontal live truck lever 228 to pivot in a counter-clockwise direction about the pivot point 302 at its inner end, thus moving the pull rod 231 to the left (Figure 7) and rotating the horizontal dead truck lever 240 in a counter-clockwise direction about the pivot point 238 intermediate its ends and so causing the live truck lever 258 to rotate in a counter-clockwise direction about the pivot point 260 at its lower end until the brake shoe 290 is brought into engagement against the periphery of the adjacent wheel. Continued actuation causes the live truck lever 258 to rotate in a counter-clockwise direction about the pivot 280 intermediate its ends, thus moving the straps 264 to the right (Figure 8) and rotating the hanger lever 268 in a counter-clockwise direction about the pivot 272 at its point of support until the brake shoe 276 is brought into engagement against the opposite periphery of said wheel.

Release of the power means will result in movement of the mechanism in the reverse of that just described, such action being facilitated by the release spring 232 which operates to move the horizontal live truck lever 228 to the left as viewed in Figure 1, thus through the medium of the pull rod 231 causing the horizontal dead truck lever 240 to be rotated in a clockwise direction about the pivot 238 and releasing the mechanism.

It will be observed, therefore, that I have provided a brake arrangement for a multiple unit railway vehicle wherein each spaced truck has a unitary brake rigging and the common truck has independent rigging at its opposite ends, the unitary rigging on each end truck being associated in operation with the rigging mounted independently on the adjacent end of the common truck. By this method I have provided a most efficient brake arrangement for such a type of vehicle and this arrangement is applicable to any multiple unit train regardless of the number of cars in the train.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:—

1. In a railway vehicle including a plurality of car bodies supported on spaced car trucks, one of said trucks providing common support for adjacent car bodies, the combination of power means mounted on each of said car bodies, live and dead horizontal levers connected at their outer ends to said power means and intermediate their ends to each other, pull rods connecting the inner ends of said live and dead horizontal levers to equalizers mounted respectively on said common truck and on a spaced truck, operative connections between said equalizers and brake riggings associated respectively with said common truck and with said spaced truck, the rigging associated with said spaced truck comprising dead truck levers supported outwardly of the wheels, hangers supporting the live truck levers intermediate the wheels, straps connecting said live and dead truck levers for each wheel, live and dead horizontal levers intermediate the wheels, said horizontal levers having their inner ends connected to said live truck levers and their outer ends connected to each other, and an operative connection between said live horizontal lever and the equalizer associated with said spaced truck.

2. In a railway vehicle including a plurality of car bodies, a truck supporting adjacent ends of said car bodies, spaced trucks supporting opposite ends of said car bodies, and brake equipment comprising power means and slack adjuster means mounted on a car body, live and dead cylinder levers connected respectively to said power means and to said slack adjuster means and connected to each other, pull rods connecting said cylinder levers to equalizers mounted respectively on said first-mentioned truck and on one of said spaced trucks for operation of brake rigging associated with each of said last-mentioned trucks, the rigging on said spaced truck comprising live and dead truck levers supported at opposite sides of each wheel, pull rods connecting said levers for each wheel, hangers supporting said rigging intermediate the wheels, live and dead horizontal levers connected respectively to said live truck levers and to each other, and an equalizer operatively connected to said live horizontal lever.

3. In a railway vehicle including a plurality of car bodies supported on spaced car trucks one of said trucks providing a common support for adjacent car bodies, the combination of power means mounted on each of said car bodies, live and dead horizontal levers connected at their outer ends to said power means and intermediate their ends to each other, pull rods connecting the inner ends of said live and dead horizontal levers to equalizers mounted respectively on said common truck and on a spaced truck, operative connections between said equalizers and brake riggings associated respectively with said common truck and with said spaced truck, the rigging mounted on said common truck comprising a dead truck lever supported outwardly of a wheel, a live truck lever supported inwardly of said wheel, straps connecting said truck levers, a dead lever having its outer end fulcrumed from said common truck and its inner end connected to said live truck lever, and an operative connection between said last mentioned dead lever and the equalizer associated with said common truck.

4. In a railway vehicle including a plurality of car bodies, a truck supporting adjacent ends of said car bodies, spaced trucks supporting opposite ends of said car bodies, and brake equipment comprising power means and slack adjuster means mounted on a car body, live and dead cylinder levers connected respectively to said power means and to said slack adjuster means and connected to each other, pull rods connecting said cylinder levers to equalizers mounted respectively on said first-mentioned truck and on one of said spaced trucks for operation of brake rigging associated with each of said last-mentioned trucks, said rigging associated with said first-mentioned car truck comprising a dead truck lever supported outwardly of a wheel, a live truck lever supported inwardly of said wheel, straps connecting said truck levers, an equalizer, and an operative connection between said live truck lever and said equalizer.

5. In a railway vehicle including spaced trucks supporting adjacent car bodies wherein a truck provides common support for a plurality of car bodies, the combination of power means and slack adjuster means mounted on a car body, live and dead cylinder levers connected respectively to said power means and to said slack adjuster means and connected to each other, independent braking means associated with the opposite ends of said common truck, unitary brake rigging mounted on a spaced truck, pull rods operatively connecting said live and dead cylinder levers respectively to said braking means and to said brake rigging, said braking means comprising a dead truck lever supported outwardly of a wheel, a live truck lever supported inwardly of said wheel, straps connecting said truck levers, an equalizer, and an operative connection between said live truck lever and said equalizer.

6. In a railway vehicle comprising adjacent car bodies mounted on spaced trucks, one of said trucks providing common support for a plurality of car bodies, the combination of brake rigging comprising power means mounted on one of said car bodies, live and dead horizontal levers having their outer ends connected to said power means and connected intermediate their ends to each other, pull rods connecting the inner ends of said live and dead horizontal levers respectively to brake means mounted at one end of said common truck and to brake rigging associated with a truck at the opposite end of said car body, said rigging comprising live and dead truck levers supported at opposite sides of each wheel, pull rods connecting said levers for each wheel, hangers supporting said rigging intermediate the wheels, live and dead horizontal levers connected respectively to said live truck levers and to each other, and an equalizer operatively connected to said live horizontal lever.

7. In a railway vehicle wherein three trucks support two car bodies, brake rigging comprising power means and slack adjuster means mounted on each car body, pairs of live and dead horizontal levers having their outer ends connected respectively to said power means and to said slack adjuster means and connected intermediate their ends to each other, pull rods connecting the inner ends of said live and dead horizontal levers respectively to brake means mounted at one end of one of said trucks independently of brake means at the opposite end thereof, and to brake rigging associated with a truck at the opposite end of said car body, said rigging comprising live and dead truck levers supported at opposite sides of each wheel, pull rods connecting said levers for each wheel, hangers supporting said rigging intermediate the wheels, live and dead horizontal levers connected respectively to said live truck levers and to each other, and an equalizer operatively connected to said live horizontal lever.

8. In a railway vehicle having three trucks supporting two car bodies, brake rigging comprising power means and slack adjuster means mounted on each of said car bodies, pairs of live and dead cylinder levers having their outer ends connected respectively to said power means and to said slack adjuster means and connected intermediate their ends to each other, pull rods connecting the respective inner ends of said live cylinder levers to brake means mounted independently on opposite ends of one of said trucks, other pull rods connecting the inner ends of said dead cylinder levers respectively to brake rigging mounted on each of the other of said trucks, said brake means comprising a dead truck lever supported on one side of a wheel, a live truck lever supported on the opposite side of said wheel, straps connecting said truck levers, an equalizer, and an operative connection between said live truck lever and said equalizer.

9. In a railway vehicle wherein three trucks support two car bodies, brake rigging comprising power means and slack adjuster means mounted on each car body, pairs of live and dead horizontal levers having their outer ends connected respectively to said power means and to said slack adjuster means and connected intermediate their ends to each other, pull rods connecting the inner ends of said live and dead horizontal levers respectively to brake means mounted at one end of one of said trucks independently of brake means at the opposite end thereof and to brake rigging associated with a truck at the opposite end of said car body, said braking means comprising a dead truck lever supported outwardly of a wheel, a live truck lever supported inwardly of said wheel, straps connecting said truck levers, an equalizer, and an operative connection between said live truck lever and said equalizer.

10. In a railway vehicle comprising adjacent car bodies mounted on spaced trucks, one of said trucks providing common support for a plurality of car bodies, the combination of brake rigging comprising power means mounted on one of said car bodies, live and dead horizontal levers having their outer ends connected to said power means and connected intermediate their ends to each other, pull rods connecting the inner ends of said live and dead horizontal levers respectively to brake beams mounted at one end of said common truck and to brake rigging associated with a truck at the opposite end of said car body, said braking means comprising a dead truck lever supported outwardly of a wheel, a live truck lever supported inwardly of said wheel, straps connecting said truck levers, an equalizer, and an operative connection between said live truck lever and said equalizer.

11. In a railway vehicle including spaced trucks supporting adjacent car bodies wherein a truck provides common support for a plurality of car bodies, the combination of power means and slack adjuster means mounted on a car body, live and dead cylinder levers connected respectively to said power means and to said slack adjuster means and connected to each other, independent braking means associated with the opposite ends of said common truck, unitary brake rigging mounted on a spaced truck, pull rods operatively connecting said live and dead cylinder levers respectively to said braking means and to said brake rigging, said rigging comprising live and dead truck levers supported at opposite sides of each wheel, pull rods connecting said levers for each wheel, hangers supporting said rigging intermediate the wheels, live and dead horizontal levers connected respectively to said live truck levers and to each other, and an equalizer operatively connected to said live horizontal lever.

12. In a railway vehicle including spaced trucks supporting adjacent car bodies wherein a truck provides common support for a plurality of car bodies, the combination of power means and slack adjuster means mounted on a car body, live and dead cylinder levers connected respectively to said power means and to said slack adjuster means and connected to each other, independent braking means associated with the opposite ends of said common truck, unitary brake rigging mounted on a spaced truck, and pull rods operatively connecting said live and dead cylinder levers respectively to said braking means and to said brake rigging.

13. In a railway vehicle including a plurality of car bodies, a truck supporting adjacent ends of said car bodies, spaced trucks supporting opposite ends of said car bodies, and brake equipement comprising power means and slack adjuster means mounted on a car body, live and dead cylinder levers connected respectively to said power means and to said slack adjuster means and connected to each other, and pull rods connecting said cylinder levers to equalizers mounted respectively on said first-mentioned truck and on one of said spaced trucks for operation of brake rigging associated with each of said last-mentioned trucks.

14. In a railway vehicle comprising adjacent car bodies mounted on spaced trucks, one of said trucks providing common support for a plurality of car bodies, the combination of brake rigging comprising power means mounted on one of said car bodies, live and dead horizontal levers having their outer ends connected to said power means and connected intermediate their ends to each other, and pull rods connecting the inner ends of said live and dead horizontal levers respectively to brake means mounted at one end of said common truck independently of rigging at the opposite end thereof and to brake rigging associated with a truck at the opposite end of said car body.

15. In a railway vehicle comprising adjacent car bodies mounted on spaced trucks, one of said trucks providing common support for a plurality of car bodies, the combination of brake rigging comprising power means mounted on one of said car bodies, live and dead horizontal levers having their outer ends connected to said power means and connected intermediate their ends to each other, and pull rods connecting the inner ends of said live and dead horizontal levers respectively to brake means mounted at one end of said common truck and to brake rigging associated with a truck at the opposite end of said car body.

16. In a railway vehicle wherein three trucks support two car bodies, brake rigging comprising power means and slack adjuster means mounted on a car body, pairs of live and dead horizontal levers having their outer ends connected respectively to said power means and to said slack adjuster means and connected intermediate their ends to each other, pull rods connecting the inner ends of said live and dead horizontal levers respectively to brake means mounted at one end of one of said trucks independently of brake means at the opposite end thereof, and to brake rigging associated with a truck at the opposite end of said car body.

17. In a railway vehicle having three trucks supporting two car bodies, brake rigging comprising power means and slack adjuster means mounted on each of said car bodies, pairs of live and dead cylinder levers having their outer ends connected respectively to said power means and to said slack adjuster means and connected intermediate their ends to each other, and pull rods connecting the inner ends of said live cylinder levers respectively to brake means mounted independently on opposite ends of one of said trucks, and other pull rods connecting the inner ends of said dead cylinder levers respectively to brake means mounted on each of the other of said trucks.

18. In a railway vehicle the combination of spaced trucks supporting adjacent car bodies, one of said trucks providing a common support for a plurality of said car bodies, power means and slack adjuster means having a common mounting on each of said car bodies, live and dead cylinder levers having their outer ends connected respectively to said power means and to said slack adjuster means and connected intermediate their ends to each other, pull rods connecting said live cylinder levers to brake rigging independently mounted on the opposite ends of said common truck, and other pull rods connecting said dead cylinder levers respectively to unitary brake rigging associated with spaced car trucks.

19. In a railway vehicle including a plurality of car bodies supported on spaced car trucks, one of said trucks providing common support for adjacent car bodies, the combination of power means mounted on each of said car bodies, live and dead horizontal levers connected at their outer ends to said power means and intermediate their ends to each other, pull rods connecting the inner ends of said live and dead horizontal levers to equalizers mounted respectively on said common truck and on a spaced truck, and operative connections between said equalizers and brake riggings associated respectively with said common truck and with said spaced truck.

20. In a railway vehicle the combination of spaced trucks supporting adjacent car bodies, one of said trucks providing a common support for a plurality of said car bodies, power means and slack adjuster means having a common mounting on each of said car bodies, live and dead cylinder levers having their outer ends connected respectively to said power means and to said slack adjuster means and connected intermediate their ends to each other, and pull rods connecting said live cylinder levers to brake rigging independently mounted on opposite ends of said common truck.

21. In a railway vehicle including spaced trucks supporting adjacent car bodies wherein a truck provides common support for a plurality of car bodies, the combination of power means mounted on a car body, independent braking means associated with the opposite ends of said common truck, unitary brake rigging mounted on a spaced truck, and operative connections between said power means and one of said braking means and said brake rigging respectively.

22. In a railway vehicle the combination of spaced trucks supporting adjacent car bodies, one of said trucks providing common support for a plurality of car bodies, brake rigging independently mounted on the opposite ends of said common truck, unitary braking means associated with a spaced truck, and power means mounted on a car body and operatively and adjustably connected between said braking means and one of said brake riggings.

RAY G. AURIEN.